Dec. 25, 1956          H. F. W. MARUHN ET AL          2,775,315
                          FLOATING WHEEL TYPE BRAKE
                            Filed Dec. 18, 1950
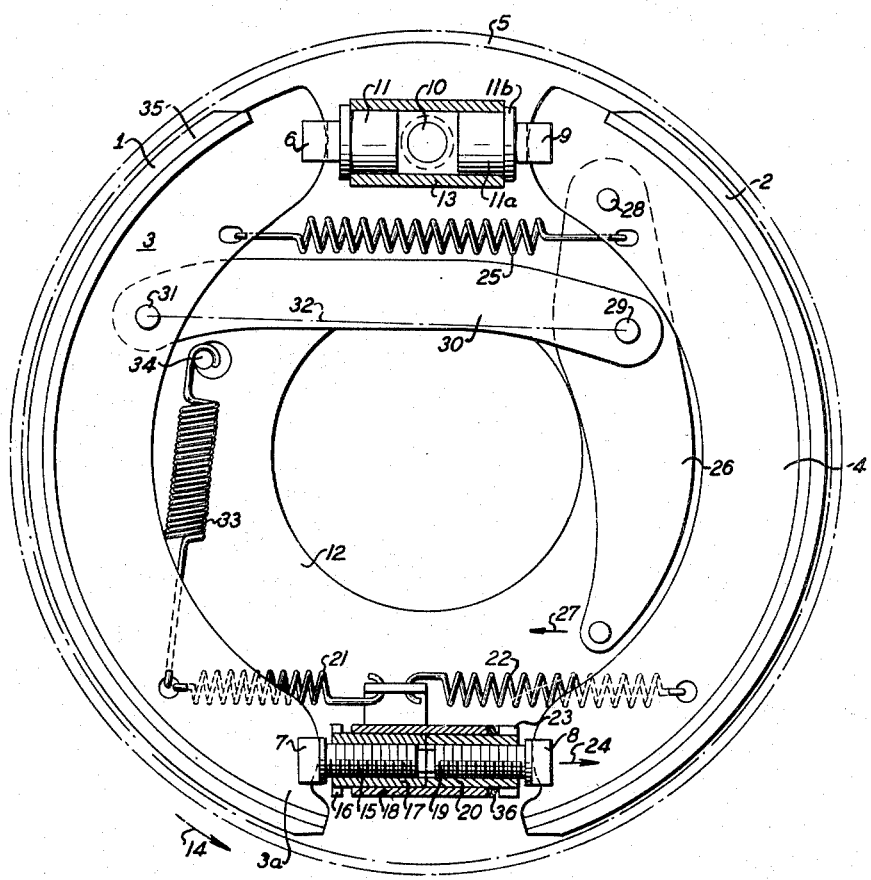
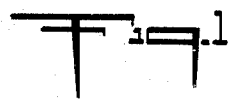
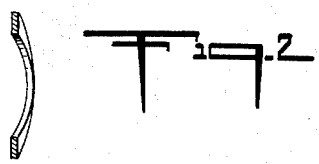

United States Patent Office 2,775,315
Patented Dec. 25, 1956

2,775,315

FLOATING WHEEL TYPE BRAKE

Herbert F. W. Maruhn, Stuttgart-Unterturkheim, and Eugen Gruhler, Fellbach, Wurttemberg, Germany, assignors to Daimler-Benz Aktiengesellschaft, Stuttgart-Unterturkheim, Germany Application December 18, 1950, Serial No. 201,268

Claims priority, application Germany December 21, 1949

3 Claims. (Cl. 188—78)

This invention relates to brakes, and more particularly to brakes for motor vehicles in which at least two brake shoes are provided supporting each other in peripheral direction of the brake drum in order to obtain a servo action.

A primary object of the invention is to provide a brake which is safe, reliable and as much as possible trouble-free in operation.

A further important object of the invention is to make such brakes suitable for use also for reverse rotation of the brake drum.

The invention relates in particular to such brakes as operate with servo action, i. e., so-called self-actuating brakes, in which the brake shoes are arranged floatingly, i. e., not being guided by articulations or levers. This prevents the vehicle wheels from locking when only a low brake actuating force is applied owing to seizing of the brake shoes on the brake drum. It has been found, however, that when the brake is released there is a tendency of the floating brake shoes to slip with the ends of their friction linings on the brake drum.

In order to obviate this drawback, one feature of the invention consists in that the end of the primary shoe which has the greater tendency to slip on the brake drum and which transmits the self-actuating force to the secondary shoe is retracted from the brake drum by particular means, preferably spring means. It is convenient to use for this purpose a spring which in its position of rest abuts with initial tension against a stop.

A further object of the invention relates to a convenient arrangement of the brake actuating and brake releasing members and in particular also to means for alternatively actuating the brake in a different way, for instance by using it both as a pedal brake and as a hand brake. Thus, according to a further feature of the invention, in order to free the brake drum and the primary shoe of all forces which might impede the action of the spring means for retracting the brake shoe, the linkage connecting the two brake shoes and comprising a lever and a link is arranged in such a manner that the connecting line between the points of articulation of the link will be substantially parallel with the direction of force of the retractile springs acting on the brake shoes. In this way upon release of the brake a uniform retraction of the brake shoes from the brake drum is obtained and it is further possible to provide the brake shoes with a friction lining over their entire length.

In order to obtain a servo action of the brake also in the reverse direction of rotation, the brake shoes are, according to a further feature of the invention, elastically supported in both directions of rotation against a relatively stationary member, in other words, the stop against which the secondary brake shoe abuts during the reverse rotation of the brake drum, for instance also in the released position of the brake, is made elastically yielding. In particular, the elastic stop is in this case so rated that its spring force is substantially greater than the counteracting force of the retractile springs but smaller than the servo action which during a reverse braking operation acts on the secondary brake shoe. In this manner it is possible to transmit this servo action from the secondary shoe to the primary shoe.

One embodiment of the invention is illustrated in the accompanying drawing, in which:

Fig. 1 shows a plan view of the brake, partly in section, with the vehicle wheel removed.

Fig. 2 is a section through a spring disc assuring a servo action also in the reverse direction of rotation.

The brake illustrated by way of example may be operated both hydraulically, for instance, as a pedal brake and mechanically, for instance, as a hand brake. The two brake shoes 3, 4 provided with friction linings 1, 2 are in known manner floatingly mounted within the brake drum 5 secured to the removed vehicle wheel (which in the accompanying drawing is therefore indicated only with dash-dotted lines), i. e., they are not mounted for swinging motion about stationary pins, but adjust themselves within certain limits into the position determined by the influence of the action and reaction forces becoming effective thereon, by being capable of displacing themselves upwardly and downwardly in the bifurcated abutments 6, 7, 8, 9 encompassing their ends.

The operation of the brake can be effected on the one hand by the brake pedal of the vehile by hydraulic pressure in which case the pressure fluid enters through an opening 10 under the pistons 11, 11a of the wheel brake cylinder 13 mounted on the backing plate 12 thereby forcing the two pistons outwardly. This results in actuation of the two brake shoes 3, 4 through the abutments 6, 9 secured thereto into engagement with the brake drum 5. The tangential force produced by the friction between the primary brake shoe 3 and the drum is transmitted upon rotation of the drum during the forward motion of the vehicle in the direction of the arrow 14 from the forward end 3a of this shoe to the abutment 7 constituting the head of a screw 15. On this screw a shiftable sleeve 17 provided with a corresponding internal thread and a toothed collar 16 is screwed. The sleeve 17 is slidably mounted in a guide cylinder 18 secured to the backing plate 12. For the abutment 8 of the secondary brake shoe 4 there is provided in symmetric arrangement thereto a screw 19 and a shiftable sleeve 20. The two shiftable sleeves 17, 20 abut in the guide cylinder 18 with their inner ends against each other and they will be so adjusted in the released position of the brake that, when there is a sufficient clearance between the two brake shoes and the brake drum under the action of the retractile springs 21, 22 acting with different forces on the brake shoes, so as to bring the sleeves 17 and 20 into the position shown in the drawing in which the shiftable sleeve 20 with its toothed collar 23 acts axially against the adjacent end surface of the guide cylinder 18 whilst the shiftable sleeve 17 with its collar 16 will be at a predetermined distance from the adjacent end surface of the guide 18.

This has as a result that the primary brake shoe 3 transmits the tangential force (servo action) produced upon application of the brakes through the shiftable sleeves 17, 20 to the secondary brake shoe 4 and applies the latter by displacing the shiftable sleeves in their guide 18 in the direction of the arrow 24 with a greater pressure on the brake drum 5 than would be possible by the piston 11a alone. The tangential force becoming active at the brake shoe 4 which is thus increased is transmitted through the mediation of the abutment 9 to the piston 11a and forces the latter again into the cylinder 13 until abutting with its collar 11b against the adjacent end surface of the cylinder. Only now the full braking effect is obtained. In the released position of the brake the brake shoes 3 and 4 are retracted from the inner surface of the brake drum not only by the springs 21, 22 but also by the retractile spring 25 acting on the two brake shoes.

It is obvious that the servo action of the brake described in the foregoing for braking the vehicle during its forward motion could not take place in the reverse motion of the vehicle if the shiftable sleeve 20 in its position of rest would positively abut with its collar 23 against the guide cylinder 18. For this reason there is provided, according to a further feature of the invention, between the collar 23 of the shiftable sleeve and the adjacent end surface of the guide cylinder a corrugated spring disk 36 with its spring rate being so selected as not to be compressed by the excess of force of the retractile spring 22 but being elastically deformed upon braking the vehicle during its reverse motion by servo action now occurring with increased strength at the brake shoe 4, thus enabling a displacement of the shiftable sleeves 17, 20 contrary to the direction of the arrow 24, so that the servo action is transmitted from the brake shoe 4 to the brake shoe 3 and accordingly the brake operates also during the reverse motion of the vehicle as a self-actuating brake.

Instead of a corrugated spring disk also other forms of spring means may be used.

The brake can be actuated in addition by the application of the hand brake lever of the vehicle which effects a pulling action at one end of a double-armed lever 26 in the direction of the arrow 27. The lever 26 is connected with its shorter arm, such as at 28, to the secondary brake shoe 4. Its point of articulation 29 is constituted by the one end of a pressure member 30 the other end 31 of which is articulated to the primary brake shoe 3. In order to prevent the occurrence of undesired transverse forces at the brake shoes through the members 26, 30 under the action of the retractile springs 21, 22, 25 which might cause slipping of the ends of the brake shoes on the brake drum in the released position of the brake, the pressure member 30 is so arranged that the connecting line 32 of its points of articulation 29, 31, is substantially parallel with the direction of action of the springs 21, 22, 25. In addition thereto the weight of the primary brake shoe 3 is taken up by a spring 33 with inherent initial tension which draws the primary brake shoe upwardly until the spring windings abut each other. The upper end of the spring 33 engages a pin 34 adjustably mounted on the backing plate 12 by means of an eccentric. The uniform retraction of the brake shoes into their released position provides the possibility, in particular as concerns the portion 3a of the primary brake shoe, to extend its friction lining 1 up to its end which provides a substantial improvement of the braking action.

Instead of limiting the stroke of the spring 33 by the windings of the same abutting each other, the retraction of the primary brake shoe 3 may also be limited by an abutment adjustably mounted on the backing plate 12. In this case the pin 34 need not be made adjustable for the engagement with the spring.

While this description has reference to one particular form of the invention it will be obvious that various other forms and modifications may be resorted to without departing from the scope of the invention.

What we claim is:

1. A brake comprising a backing plate, a rotating brake drum having an annular, inwardly directed braking surface, a first brake shoe extending over a portion of said braking surface, a second brake shoe extending over another portion of said braking surface, supporting means stationarily supported on said backing plate and interposed between the one end of said first brake shoe extending in the main direction of rotation of said brake drum and the adjacent end of said second brake shoe to tangentially transmit limited rotational movement of each of said brake shoes to the other of said brake shoes, means operative to urge said brake shoes outward into braking engagement with the related portions of said braking surface, first spring means yieldably retracting said brake shoes with different forces out of engagement with said braking surface and mutually supporting said brake shoes through said supporting means, said first spring means being further operative to urge said brake shoes to rotate to a limited extent in the direction opposed to said main direction of rotation of said brake drum, and second spring means acting in the direction opposed to the action of said first spring means on said second brake shoe and of sufficient strength so as not to be compressed by the action of said first spring means on said second brake shoe and to maintain said brake shoes in released condition at a predetermined distance from said supporting means, the force of said second spring means being smaller than the servo-action acting in the direction opposed to said second spring means on said second shoe during a reverse braking operation.

2. A brake according to claim 1; wherein said supporting means is provided with two abutments at the opposite sides of said stationary member and alternately engageable with the latter to limit the rotational movement of said brake shoes, and wherein said second spring means consists of an undulated spring disc interposed between one of said abutments and said stationary member.

3. A brake comprising a rotating brake drum having an annular inwardly facing braking surface, a first brake shoe disposed within said drum and extending over a portion of said surface, a second brake shoe substantially diametrically opposed to said first brake shoe and extending over another portion of said surface, a tangentially extending fixed guide member disposed between the one end of said first shoe extending in the main direction of rotation of said drum and the adjacent end of said second shoe, supporting means carried by said guide member and movable tangentially relative to the latter, said supporting means having said one end of the first shoe and said adjacent end of the second shoe bearing against the opposite ends thereof to transmit rotational movement of each of said shoes toward said guide member to the other of said shoes, first spring means connected between said shoes and said guide member and acting parallel to the tangential direction of movement of said supporting means to urge said one end of the first shoe and said adjacent end of the second shoe in the directions toward said fixed guide member with different forces and into bearing engagement with said supporting means, means operative to urge at least said first brake shoe into braking engagement with the related portion of said braking surface, and second spring means acting on said supporting means in the direction of movement of the latter and in opposition to said first spring means, said second spring means being strong enough so as not to be compressed by the effect of said first spring means on said second brake shoe and to displace said supporting means to a position maintaining said shoes out of engagement with said braking surface, said supporting means including bifurcated end portions receiving the related ends of said brake shoes and permitting free and independent displacements of said related ends of said brake shoes at right angles to the tangential direction of movement of said supporting means in a plane normal to the axis of rotation of said drum; and further comprising resilient means connected to said first shoe and operative to lift said one end of the first shoe from the related portion of the braking surface in the direction of said free and independent displacements.

References Cited in the file of this patent

UNITED STATES PATENTS

| | | |
|---|---|---|
| 1,875,000 | Hillerman | Aug. 30, 1932 |
| 1,901,668 | Poehlman | Mar. 14, 1933 |
| 1,913,166 | Lindblom | June 6, 1933 |
| 1,921,593 | Taylor | Aug. 8, 1933 |
| 1,978,679 | La Brie | Oct. 30, 1934 |
| 1,986,430 | Frank | Jan. 1, 1935 |
| 1,992,226 | McConkey | Feb. 26, 1935 |
| 2,022,254 | Pentz | Nov. 26, 1935 |
| 2,074,717 | Bendix | Mar. 23, 1937 |
| 2,102,851 | La Brie | Dec. 21, 1937 |
| 2,144,023 | La Brie | Jan. 17, 1939 |
| 2,167,706 | Berno | Aug. 1, 1939 |
| 2,287,238 | Goepfrich | June 23, 1942 |
| 2,294,329 | Ayers et al. | Aug. 25, 1942 |
| 2,316,450 | Parnell | Apr. 13, 1943 |
| 2,322,121 | Frank | June 15, 1943 |